Dec. 23, 1952  M. C. YEASTING  2,622,868
MOTOR OPERATED WEIGHING SCALE
Filed Jan. 16, 1947  7 Sheets-Sheet 1
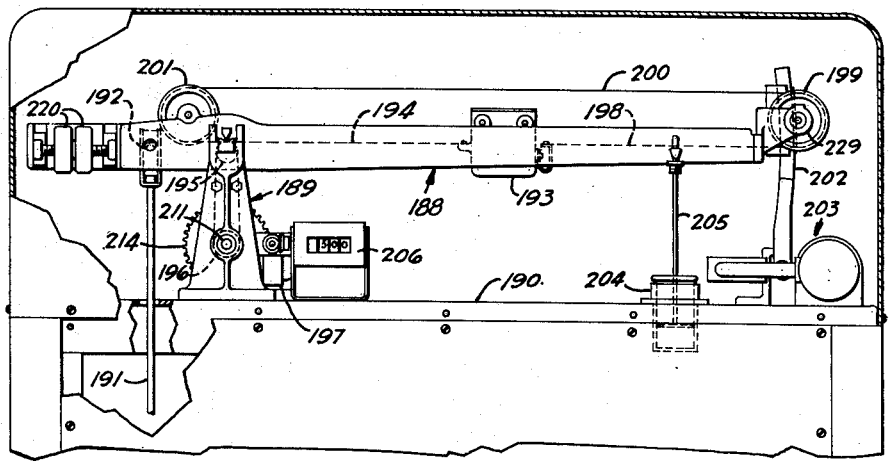
Fig. I
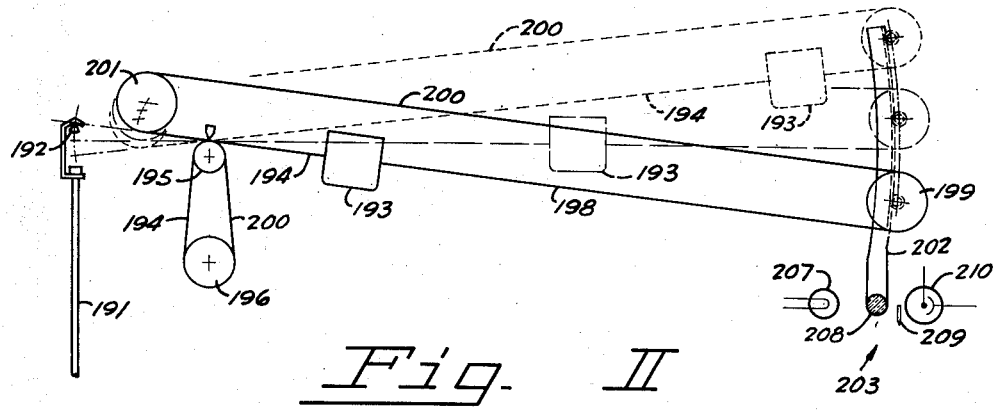
Fig. II
INVENTOR.
Maynard C. Yeasting
BY
Marshall and Marshall
ATTORNEYS

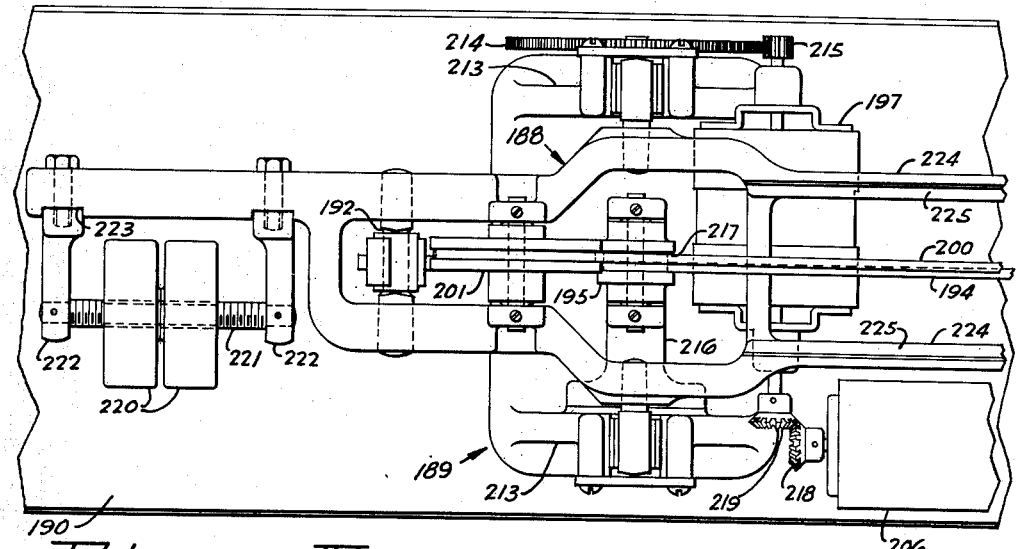
Fig. IV
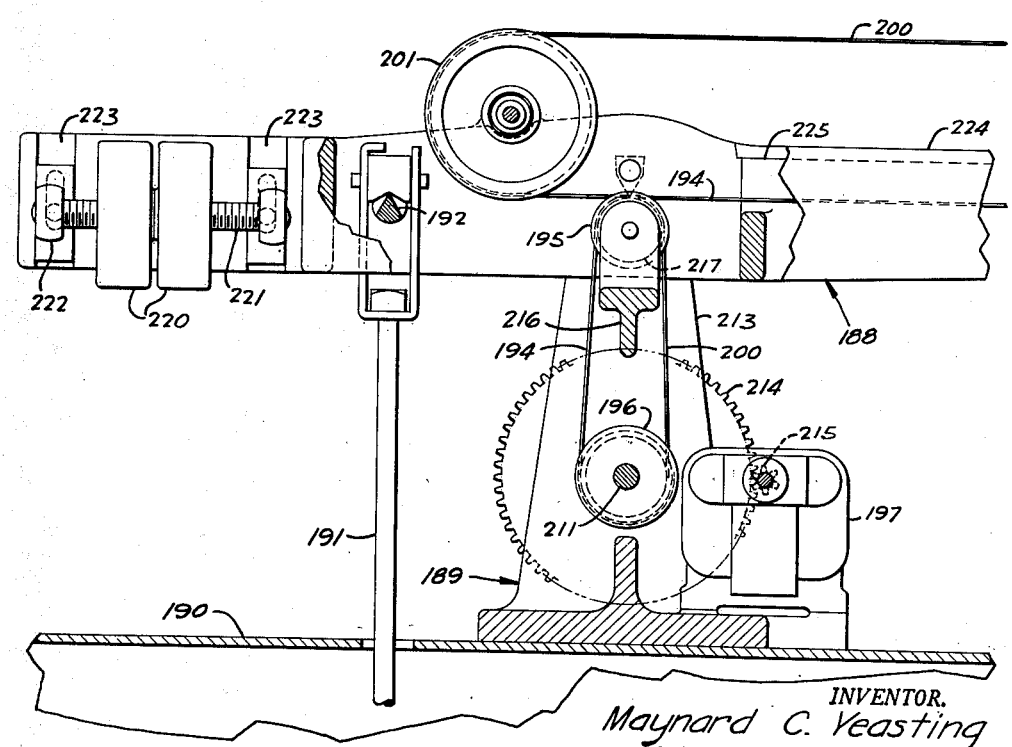
Fig. III

Dec. 23, 1952      M. C. YEASTING      2,622,868
MOTOR OPERATED WEIGHING SCALE
Filed Jan. 16, 1947      7 Sheets-Sheet 3
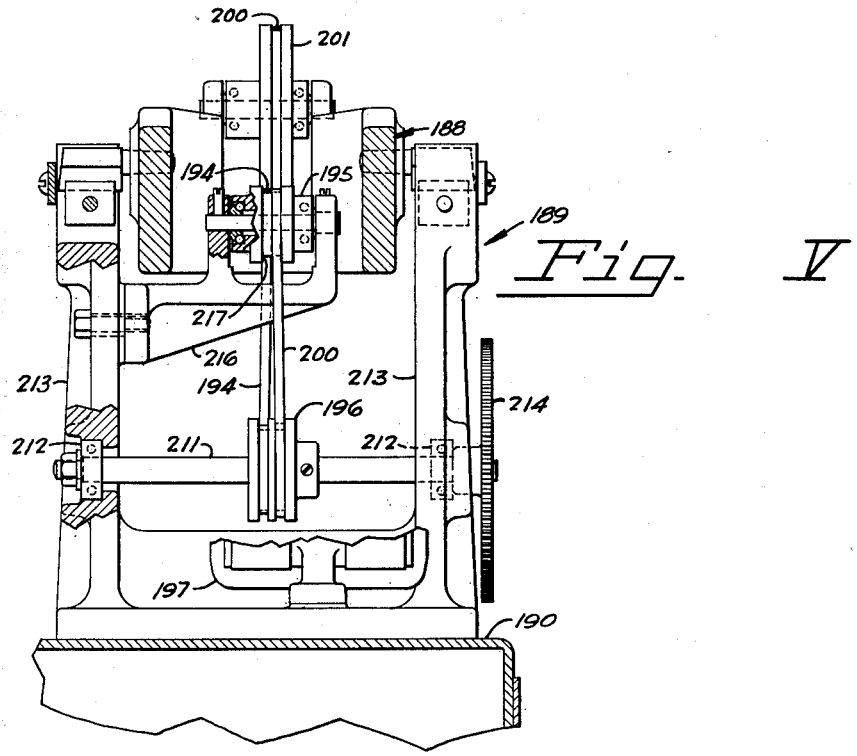
Fig. V
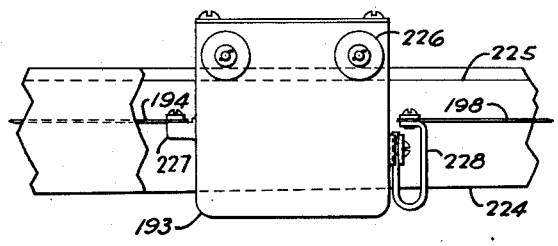
Fig. VI
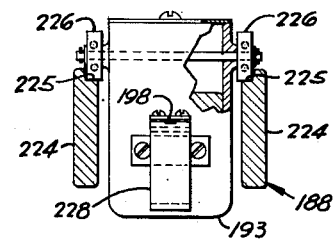
Fig. VII
INVENTOR.
Maynard C. Yeasting
BY
Marshall and Marshall
ATTORNEYS

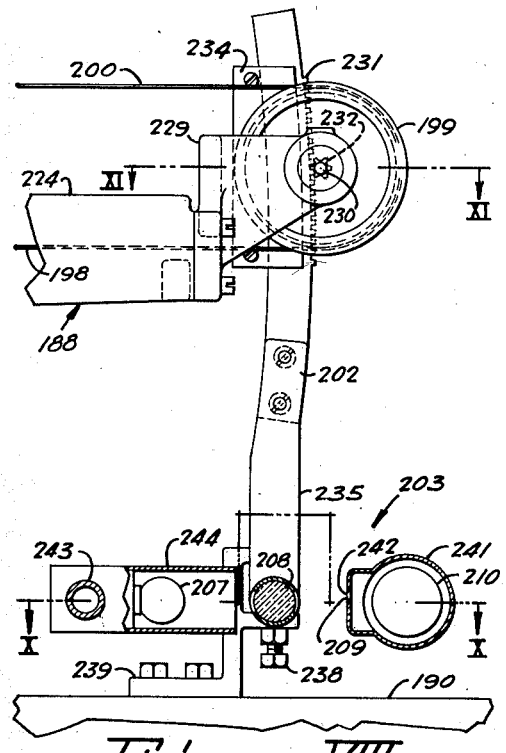
Fig. VIII
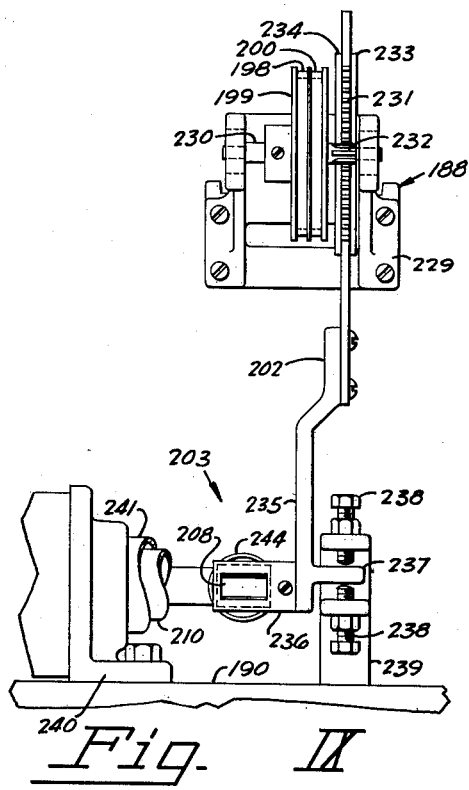
Fig. IX
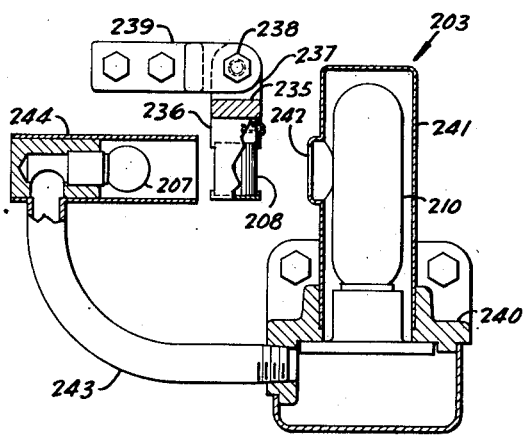
Fig. X
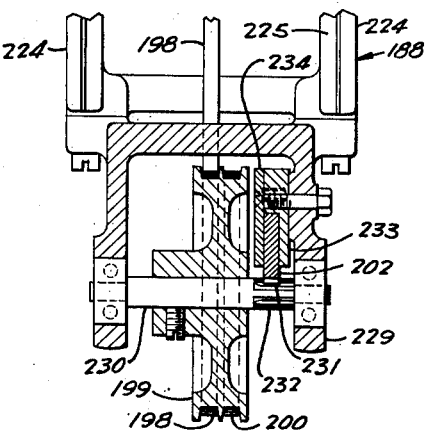
Fig. XI
INVENTOR.
Maynard C. Yeasting
BY
Marshall and Marshall
ATTORNEYS Dec. 23, 1952 M. C. YEASTING 2,622,868
MOTOR OPERATED WEIGHING SCALE
Filed Jan. 16, 1947 7 Sheets-Sheet 5
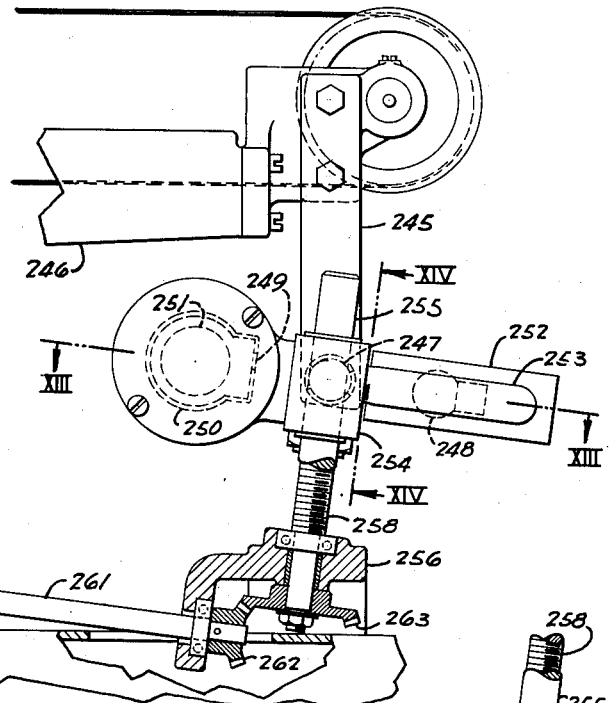
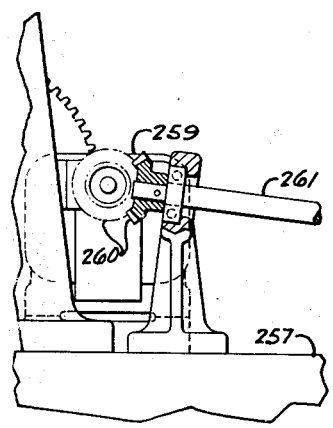
INVENTOR.
Maynard C. Yeasting
BY
Marshall and Marshall
ATTORNEYS

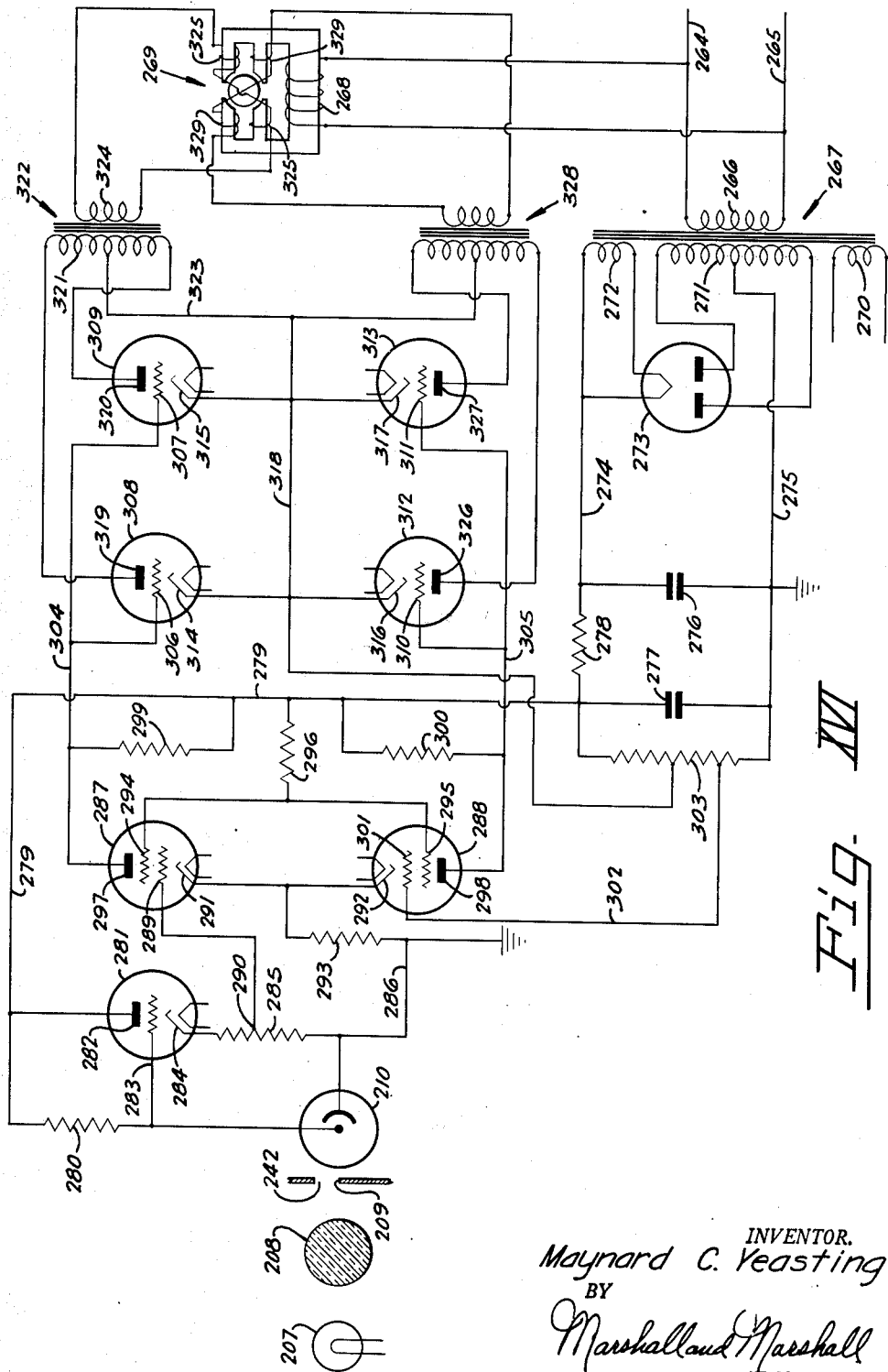
Fig. XVI

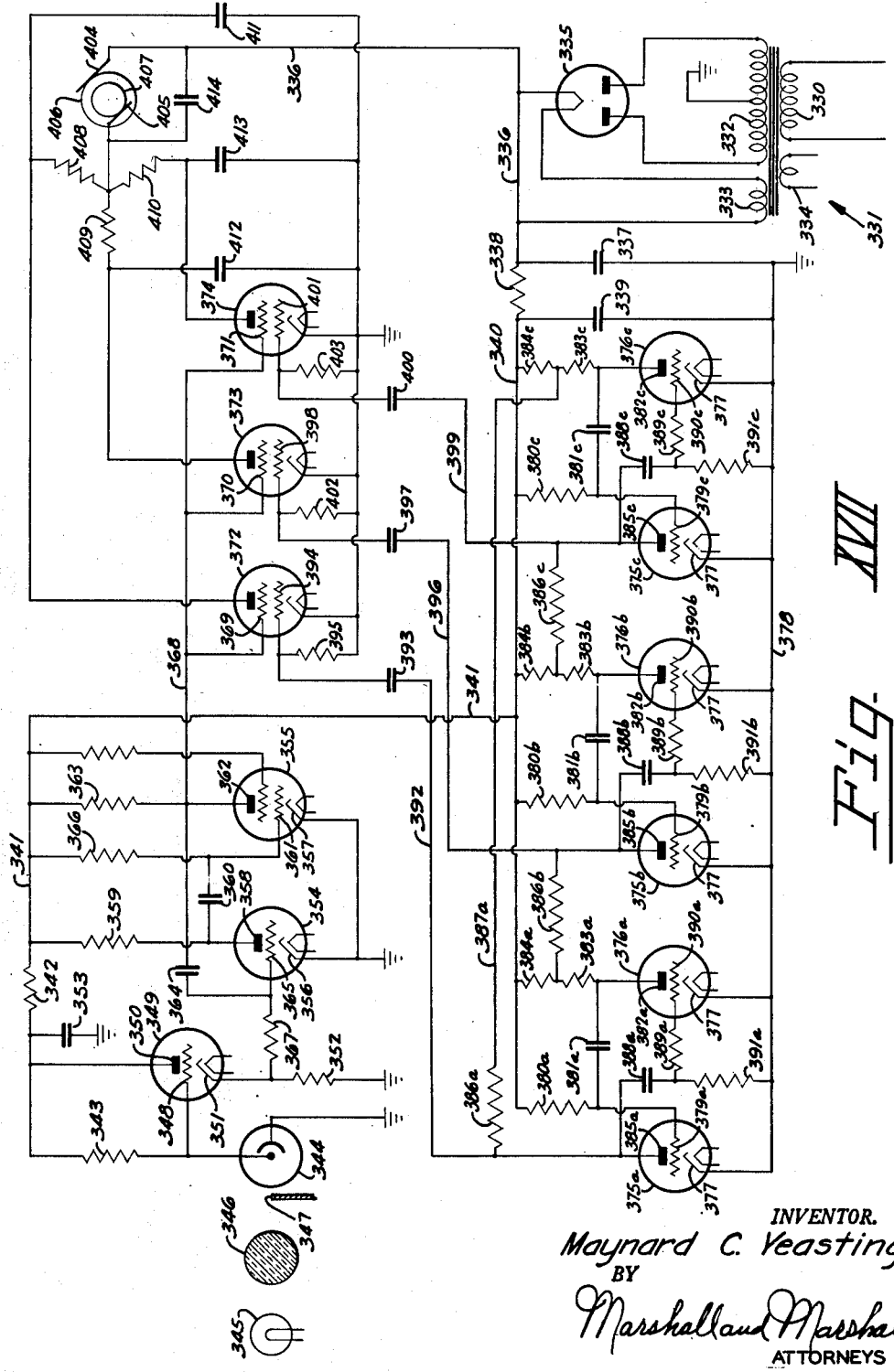
Fig. XVII

Patented Dec. 23, 1952

2,622,868

UNITED STATES PATENT OFFICE 2,622,868

MOTOR OPERATED WEIGHING SCALE

Maynard C. Yeasting, Elmore, Ohio, assignor to Toledo Scale Company, Toledo, Ohio, a corporation of New Jersey Application January 16, 1947, Serial No. 722,428

15 Claims. (Cl. 265—56)

This invention relates to weighing scales and in particular to a weighing scale in which a follow-up mechanism drives a load counterbalancing poise along a beam in accordance with the position of an indicator.

Weighing scales employing springs or pendulums to counterbalance load forces are subject to the disadvantage that the only force available for driving an indicator is the difference between the counterbalancing force of the spring or pendulum and the load force applied thereto. It is thus apparent that the accuracy of such a weighing scale can only be improved by reducing the force required to move the indicator.

Weighing scales employing motors to drive a load counterbalancing poise along a weigh beam are subject to the disadvantage that their speed of operation must either be made very slow or their sensitivity must be very greatly reduced.

The principal object of this invention is to provide a motor driven weighing scale in which the position of the poise along a beam and the position of the beam is combined into a signal that is used to control a motor driving the poise.

Another object of the invention is to include in the control signal for a poise driving motor a component that is related directly to poise position.

A still further object of the invention is to provide a motor driven weighing scale with a control that permits the weighing lever to assume different positions for different loads, and in which the poise is positioned along the lever in accordance with the different positions.

An ancillary object is to provide a motor control circuit and motor that is capable of producing the rated torque of the motor whether the motor is operating at slow or high speed and in which the torque of the motor is entirely independent of the speed at which it is operating.

These and other objects and advantages are apparent from the following description in which reference is made to the accompanying drawings illustrating a weighing scale embodying the invention.

The invention consists in an automatic weighing mechanism that has a pivotally mounted load supporting lever along which a poise is moved to counterbalance the load and to which an indicator is attached for indicating the position of the lever and a follow-up mechanism for driving the poise along the lever in accordance with the position assumed by the indicator.

In the improved automatic weighing mechanism the indicator for indicating the movement of the lever may be separately mounted indicator cooperating with a stationary chart, it may be a member attached to the end of the load supporting lever and cooperating with a fixed chart in a manner similar to the tip of an ordinary weigh beam, or it may take the form of a member carried on the load supporting lever and moved with respect to the lever according to the position of the poise so that its position with respect to a fixed index point indicates the condition of balance between the load and the counterbalancing effect of the poise. Indicators of the last two forms are illustrated in the drawings. The follow-up mechanism may take the form of a motor driven member which is maintained in registry with an indicator of the first or second types mentioned, or it may take the form of a member carried on the lever and moved with respect to the lever according to poise position. This is also a follow-up because the member moves with respect to the lever so that the member maintains its registry with a fixed index point. This latter arrangement corresponds to the last type of indicator mentioned.

The improved automatic weighing mechanism, in one of its forms, consists in a weigh beam, a follow-up mechanism for maintaining a motor driven member in registry with the tip of an indicator that is driven by the weigh beam and a mechanical connection from the follow-up mechanism for driving a poise along the weigh beam in accordance with the position of the member maintained in registry with the weigh beam position indicator.

In another form of the invention, a member that is mounted on the weigh beam and moved with respect to the weigh beam in accordance with the poise position cooperates with a fixed index and any discrepancy between the position of the member and the fixed index is converted into a motor driving signal that moves the poise and the member with respect to the weigh beam in a direction to reduce the magnitude of the discrepancy.

All forms of the invention are characterized in that the signal for controlling the poise driving motor has two components, the first of which is derived from the position of the poise along the beam and the other of which is derived from the position of the beam. This combination of the two signals permits the poise to be operated at very rapid rates of speed without loss of stability or accuracy in arriving at the final balance position. The component of the signal corresponding to the poise position permits this high speed operation because this signal is immediately affected by the movement of the poise without waiting for the beam to respond to the change in position of the poise.

An automatic weighing mechanism embodying these improvements is illustrated in the accompanying drawings.

In the drawings:

Figure I is a front elevation, with parts broken away, of the improved automatic weighing mechanism.

Figure II is a schematic diagram illustrating the operation of the weighing mechanism in counterbalancing a load.

Figure III is an enlarged vertical section of the fulcrum end of the lever.

Figure IV is a fragmentary plan of the fulcrum end of the lever.

Figure V is an elevation, partly in section, of the fulcrum support for the lever.

Figure VI is a front elevation of the weighing scale poise.

Figure VII is an end elevation of the poise.

Figure VIII is a side elevation, partly in section, of the tip end of the weigh beam and the mechanism for detecting movements of the weigh beam.

Figure IX is an end elevation of the tip end of the weigh beam.

Figure X is a horizontal section taken substantially along the line X—X of Figure VIII.

Figure XI is a fragmentary horizontal section taken substantially along the line XI—XI of Figure VIII.

Figure XII is a fragmentary elevation, partly in section, of a modified form of control mechanism for the automatic weighing scale.

Figure XIII is a substantially horizontal section taken along the line XIII—XIII of Figure XII.

Figure XIV is a fragmentary elevation as seen from the line XIV—XIV of Figure XII.

Figure XV is a fragmentary side elevation of the support for the beam follow-up mechanism.

Figure XVI is a schematic wiring diagram of an electronic motor control circuit suitable for actuating the follow-up motor.

Figure XVII is a schematic wiring diagram of another motor control circuit suitable for controlling a motor that drives a weighing scale poise.

The specific figures and the accompanying description are intended merely to illustrate the invention and are not intended to impose limitations on the claims.

The improved weighing scale mechanism consists of a lever 188 that is pivotally mounted on a fulcrum stand 189 erected from a weigh beam shelf 190. Forces to be counterbalanced, e. g. forces from a load supporting lever system, are applied to a steelyard rod 191 that is pivotally suspended from a load pivot 192 of the lever 188. The moments produced by the forces applied to the load pivot 192 are counterbalanced by a poise 193 that is movable along a portion of the length of the lever 188. The poise 193 is drawn toward the fulcrum of the lever 188 as a steel ribbon 194 trained over a pulley 195 mounted in the fulcrum stand 189 is wound onto a drum 196 which in turn is driven through gearing from a motor 197. As the poise 193 moves toward the fulcrum it unwinds a steel ribbon 198 from a pulley 199 mounted on the tip of the lever 188. As the ribbon 198 is unwound another ribbon 200 is wound onto the pulley 199 so that in effect it is a continuation of the steel ribbon 198 except that all possibility of slipping between the ribbons and the pulley 199 is eliminated. The steel ribbon 200 is trained over a pulley 201 that is journaled at the fulcrum end of the lever 188 and, after passing over the pulley 201, is trained over the pulley 195 and is wound on the drum 196. The portions of the steel ribbons 194 and 200 approaching the pulley 195 from the lever 188 lie in the pivot line of the lever 188. The pulley 195 in turn is located so that the pivot line of the lever is tangent to its upper surface with the result that tension in the ribbons for producing motion of the poise 193 does not introduce any moment tending to unbalance the lever 188. This arrangement of steel ribbons and pulleys permits the motor 197, which is mounted either on the weigh beam shelf 190 or on the fulcrum stand 189, to drive the poise 193 to load counterbalancing position without having the driving mechanism interfere with the accuracy of balance of the lever 188.

A slide 202 mounted in the end of the lever 188 is connected through gearing to the pulley 199 and is arranged so that motion of the poise 193 along the lever 188 moves the slide 202 vertically with respect to the lever 188. The gearing is such that if the poise is moving toward the fulcrum end of the lever 188 the slide 202 is moved upwardly with respect to the lever 188. The position of the slide 202 with respect to the lever 188 may be said to be an indication of the position of the poise 193. The lower end of the slide 202 cooperates with a photo-electric device 203 which serves to sense the vertical position of the slide 202 with respect to the weigh beam shelf 190 and convert that position into a signal which, when suitably amplified, causes the motor 197 to drive the slide 202 toward its neutral or steady state position relative to the weigh beam shelf 190. The motor 197 in driving the slide 202, also drives the poise 193 along the lever to correct the error in balance between the poise position and the load that causes the lever 188 to carry the slide 202 away from its neutral position.

A dash pot 204 is connected through a stem 205 to the lever 188 and serves to reduce the oscillation of the lever 188 in response to suddenly applied loads or changes in position of the poise 193.

The revolutions of the motor 197 are indicated by a counter 206. Because of the direct relation between the revolutions of the motor 197 and the position of the poise 193, the indication of the counter 206 is a direct function of the load being counterbalanced.

The mode of operation of the improved automatic weighing mechanism is illustrated in Figure II. When there is no load on the weighing mechanism the poise 193 is located near the fulcrum of the lever 188, the slide 202 is drawn upwardly with respect to the lever, and the tip of the lever 188 is at its lowermost position. When a load is applied to the steelyard rod 191 the tip of the weigh beam rises and in rising carries the slide 202 upwardly so that light from a light source 207 of the photoelectric device 203 that is focused by a cylindrical lens 208 mounted in the lower end of the slide 202 is directed past a light interceptor 209 and into a photocell 210. The increase in light acting through an amplifier connected to the photocell 210 causes the motor 197 to drive the poise 193 outwardly along the lever 188 and, at the same time, drive the slide 202 downwardly with respect to the lever 188 so as in effect, to cancel the upward movement of the lever 188. The cancelation is not complete because the lever continues its upward movement.

The upward movement of the lever and the outward travel of the poise 193 continue until the poise 193 approaches load counterbalancing position. The dash pot 204 by retarding the upward movement of the lever 188 as balance is approached causes the motor, still driving at full speed, to drive the slide 202 downwardly with respect to the lever 188 faster than the lever 188 is rising until a portion of the light focused by the lens 208 is intercepted by the light interceptor 209. As the light is intercepted the motor is decelerated so that equilibrium between the upward velocity of the lever 188 and the downward velocity of the slide 202 with respect to the lever 188 is maintained. Thus, when the load is counterbalanced and the lever 188 stops the slide 202 is in its neutral position with respect to the photoelectric device.

The operation is similar to an automatic follow-up mechanism in that the motor continuously attempts to maintain the slide 202 in a fixed relation with respect to the photoelectric device 203. The motion of the slide 202 with respect to the photoelectric device 203 is the difference between the upward motion of the lever 188 and the downward motion of the slide 202 with respect to the lever 188 produced by movement of the poise 193. As long as this difference is zero the motor is not energized and the mechanism remains at rest. As soon as a change in load occurs a motion of the lever 188 results and the motor 197 immediately attempts to cancel the lever movement by moving the slide 202, which movement incidentally moves the poise 193 into load counterbalancing position. There is no difficulty from hunting or overshooting with this arrangement because the position of the slide 202 changes immediately with any rotation of the motor and thus there is no time lag between a movement of the motor and a response at the photoelectric device. If the photoelectric device 203 were responsive only to the lever 188 a considerable change in poise position could be made before the inertia of the lever 188 would permit it to respond to changes in balance and register a change at the photoelectric device. It is this time lag that produces instability in ordinary motor driven weighing mechanisms and which is eliminated by moving the slide 202 with respect to the lever 188 in accordance with the movement of the poise 193 along the lever.

This mechanism is, in effect, a follow-up device because it acts to cause relative movement between two parts of a structure so as to maintain one of the parts in registry with an independent element during independent movement of the other of the two relatively movable parts. In an ordinary follow-up mechanism a motor drives a driven element to maintain the driven element in registry with an independently movable element. In the weighing scale mechanism the motor drives the slide 202 with respect to the lever 188 so as to maintain the lower end of the slide 202 in registry with the photoelectric device 203.

Ordinarily the third or the independent element that is being followed is a moving member that cooperates with a fixed chart for indicating a position. The follow-up mechanism must then move the driven element to a position corresponding to that of the condition responsive element. The weighing mechanism differs from this ordinary arrangement in that the driven element, the slide 202, is carried on the condition responsive member and is moved with respect thereto so as to maintain the driven element in registry with a fixed reference member—the photoelectric device 203. In this manner the poise position and the lever position are interrelated and the poise position is determined by the position of the lever. The absence of any physical connections to the lever 188 other than through the load pivot 192 and the dash pot stem 205, means that the friction can be reduced to that of a beam scale. The change in lever position with load corresponds to the change in lever positions with load of a pendulum scale and in common with a pendulum scale the time for reaching a balance is very much less than that of a beam scale.

Referring to Figure III, the drum 196 on which the poise driving ribbons 194 and 200 are wound is secured to a shaft 211 that is journaled in bearings 212 (Figure V) mounted in upright portions 213 of the fulcrum stand 189. The shaft 211 carries a gear wheel 214 that meshes with a pinion 215 mounted on the armature shaft of the motor 197. The lever 188 (Figure IV) is divided throughout most of its length and at its fulcrum its side members are spread to make space for a bracket 216 that is attached to one of the upright portions 213 of the fulcrum stand 189 and which carries the pulley 195 over which the poise driving ribbons 194 and 200 are trained. The pulley 195 has a groove 217 for guiding the steel ribbons and it is the bottom of this groove that at its uppermost point is made tangent to the pivot line of the lever 188. The pulleys 195 and 201 are carried on ball bearings not only to reduce friction in the drive but also to insure their positive positioning. The position of the poise with respect to the pivots of the lever 188 is indicated by the distance from the drum 196 over the respective pulleys to the poise and any change in position of a pulley affects this distance and introduces error into the indication.

The indication of load is taken from the counter 206 which is driven through bevel gears 218 and 219 from the armature shaft of the motor 197. The driving bevel gear 219 is mounted on the opposite end of the armature shaft from the pinion 215.

Balancing weights 220 threaded on a rod 221 which is mounted in brackets 222 extending laterally from the tail end of the lever 188 serve to balance the lever and permit an adjustment of the no-load condition of balance. The brackets 222 are secured in vertical slots 223 so that changes in vertical position for adjusting the pendularity of the lever may easily be made.

Referring to Figures IV, VI and VII, that portion of the lever 188 along which the poise 193 travels, consists of parallel rails 224 having tracks 225 cut in their upper surface in position to carry and guide ball bearings 226 serving as wheels for the poise 193.

The steel ribbon 194, Figure VI, is rigidly attached to an ear 227 extending from an end of the poise 193. The steel ribbon 198 leading from the poise 193 toward the tip of the lever 188 is connected to the poise through a stiff spring 228. The spring is necessary to accommodate the effective change in length of the steel ribbon circuit as one ribbon winds on a drum and another ribbon unwinds from the same drum. The change in length is the result of the increase in effective diameter of the take up drum as more turns of ribbon are added and the effective decrease in diameter of the pay out drum as turns are removed. There are two drums on which steel ribbons are wound, namely, the drum 196 and the pulley 199. When the poise is in its midposition there is a minimum of ribbon wound on the drums. As the poise is driven toward one end or the other of its travel the drum 196 and the pulley 199 each wind up more ribbon than they unwind, because of the increase in radius as the ribbon is wound and the decrease as it is unwound. If desired, springs may be employed on each side of the poise to distribute the apparent changes in ribbon length and secure more nearly exact correspondence between drum rotation and poise travel.

Referring to Figures VIII, IX, X and XI, a U-shaped bracket 229 extending longitudinally from the tip of the lever 188 journals a shaft 230 that carries the pulley 199. The slide 202 is guided between plates 233 and 234 attached to the U-shaped bracket 229. The upper portion of the slide 202, the portion that slides between the guide plates 233 and 234, is formed as an arc of a circle having its center at the fulcrum of the lever 188. The slide 202 being fashioned in this manner remains substantially stationary in space as it is moved up and down relative to the lever 188 as the lever 188 oscillates on its fulcrum.

The lower end of the slide 202 is provided with an extension 235 which has a laterally extending arm 236 carrying the lens 208. A finger 237 also extending laterally from the extension 235 is positioned between adjustable stop screws 238 mounted in a horizontally bifurcated portion of a stop bracket 239 that is erected from the weigh beam shelf 190. The stop screws 238 are set with sufficient clearance from the finger 237 so that the slide 202 may move vertically only sufficiently far to fully illuminate the photocell 210 or to completely darken it. The stops thus serve to control the motion of the lever 188 when the velocity of the lever under the influence of a load tends to exceed the rate at which the motor 197 can drive the slide 202. The stops 238 thus maintain the parts close to their normal operative relation until the motor has had time enough to bring the poise near its load counterbalancing position. As the unbalance between the load and the poise position decreases, the tendency for the lever 188 to move also decreases thereby allowing the dash pot to decrease the lever velocity. The slide 202 then moves downwardly in space toward its neutral position. The stops 238 thus come into play only in the event that the rate of change in load is greater than the rate at which the motor 197 can drive the poise 193.

The photoelectric device 203 includes a bracket 240 supporting the photocell 210 which is enclosed in a light-tight shield 241 having in one side a narrow window 242 through which light is admitted to the photocell 210. A tubular arm 243 extending from the bracket 240 carries a tube 244 on which the light source bulb 207 is mounted. Light from the bulb 207 is focused by the cylindrical lens 208 into a thin line of light at the window 242 one edge of which serves as the light interceptor 209. When the slide 202 is in its neutral position half of the thin line of light is intercepted by the lower edge of the window 242 and under this condition there is no signal transmitted to the poise driving motor. If, for any reason the slide 202 moves upwardly the upward movement of the lens raises the line of light so that all of the light then falls on the photocell 210. Similarly a downward movement of the slide 202 moves the line of light below the lower edge of the window 242 so that the photocell is darkened. Mounting the lens 208 from the slide 202 affords twice as much change in light for a given slide movement as results if the lens is stationary and an interceptor having a window similar to the window 242 is employed as a shutter mounted on the slide.

In this embodiment of the invention either the movement of the lever 188 in response to a change in load, or a movement of the slide 202 in response to a change in poise position changes the light input to the photocell and consequently the signal to the poise driving motor. Since the motor is responsive to the combination of these signals it can have a very fast response and yet not be unstable in operation. This follows because a change in load which causes a change in position of the lever 188 produces a poise driving signal, but any movement of the poise 193 in response to the signal immediately moves the slide 202 in such direction as to cancel the signal without waiting for the lever 188 to stop or to return to its original position. By eliminating the return movement of the lever 188 the effect of its inertia is eliminated and, by the elimination of the effect of the inertia, very quick response is attained with stability.

It is not necessary that the slide 202 be carried from the end of the lever 188. An alternative construction that permits the same type of control having the same advantages is illustrated in Figures XII to XV inclusive. In this alternative construction a bracket 245 depending from the tip of a lever 246 carries a cylindrical lens 247. The lens 247 serves to focus light from a light source 248 onto the edge of a window 249 cut in the side of an enclosure 250 that serves to shield a photocell 251 from extraneous light. The light source 248 is mounted within a tube 252 which is carried from the end of a curved pipe 253. The pipe 253 is threaded into a carriage 254 that also includes mounting means for the photoelectric cell 251. The carriage 254 is slidably mounted on a pair of guide rods 255 that are erected from a base 256 that is secured to a weigh beam shelf 257. A lead screw 258 rotatably journaled in the base 256 threadedly engages the carriage 254 and serves to drive the carriage 254 along the guide rods 255. The lead screw 258 and the guide rods 255 are inclined from the vertical by an amount such that the carriage 254 moves along substantially the same path as that traversed by the lens 247 while the lever 246 oscillates.

A poise driving motor 259 is connected through bevel gears 260 to a shaft 261 that extends along the weigh beam shelf 257 and has an end journaled in the base 256. Bevel gears 262 and 263 connect the shaft 261 to the lead screw 258. The gearing from the motor 259 to a poise operated along the lever 246 and from the motor 259 to the lead screw 258 is such that when the poise is driven toward the tip of the lever 246 the carriage 254 is driven upwardly along the guide rods 255. In this arrangement an increase in load which raises the tip of the lever 246, raises the lens 247 with respect to the light path between the light source 248 and the photocell 251 so that the beam of light which was initially focused on the edge of the window 249 now enters the window and acting through the photocell 251 produces a signal tending to cause the motor to drive the poise outwardly along the lever 246. The outward movement of the poise is accompanied by an upward movement of the carriage 254 which upward movement tends to restore the light beam to the edge of the window 249 and thus stop the motor.

The signal to the motor in this alternative arrangement, like that in the first, is produced either by motion of the lever 246 or by motion of the carriage 254 or a combination of the motions and, thus, has components corresponding to the beam motion and to the poise motion.

This alternative arrangement is a follow-up in that it has an independently movable member—the lever 246, carrying an indicator—the lens 247, a driven member—the carriage 254, and a motor and control for driving a driven member in a direction to keep it in registry with the indicator of the independently movable member. It is only incidental to the follow-up that a poise is driven along the lever 246 by the follow-up motor—the motor 259.

The lens 247 constitutes an indicator that is driven by weighing mechanism and it is immaterial whether that indicator be rigidly connected to a lever of the weighing mechanism or whether that indicator be driven or connected to the weighing mechanism through intermediate motion transmitting devices. The essential feature is that a poise is driven along the lever 246 by a follow-up mechanism which is responsive to the position of the lever 246.

In each of these embodiments of the invention a light source and photoelectric cell are illustrated as being the preferred structure for converting a change in relative position between the independently movable elements and the follower elements into an electrical signal which, after amplification, may be used to control the poise driving motor. It is intended that this type of pick-up device shall be representative of means for converting the change in relative position of the elements into a signal for controlling a motor and that such means may also include as equivalent structure electromagnetic, electrostatic or similar devices that convert physical displacements into electrical signals.

An electrical circuit that may be utilized to convert the electrical signal derived from the motion detecting means into a signal suitable for controlling the poise driving motor is illustrated in Figure XVI. In this circuit, alternating current power supplied through leads 264 and 265 is utilized to energize the primary winding 266 of a transformer 267 and a field winding 268 of a shaded-pole induction motor 269 which may function as the poise driving motor 197 or 259.

The transformer 267 has a filament winding 270, a high voltage winding 271 and a rectifier filament winding 272. A rectifier tube 273 connected to the windings 271 and 272 supplies high voltage direct current power to a positive lead 274 and a negative ground lead 275. Condensers 276 and 277 and a resistor 278 serve to filter the output of the rectifier 273.

The photoelectric cell 210 is energized by current that flows from the positive high voltage lead 274 through the resistor 278, a lead 279, a resistor 280 and through the photocell 210 to ground. In this arrangement the voltage across the photoelectric cell 210 corresponds to the amount of light that it receives. Since the amount of current that may be passed through a photoelectric cell is very small, the resistor 280 must have a high resistance value so that appreciable changes in voltage are produced by the changes in light input to the photocell 210. A cathode loaded amplifier tube 281 has its plate 282 connected to the positive high voltage lead 279, has its grid 283 connected to the junction between the resistor 280 and the photoelectric cell 210, and has its cathode 284 connected through a potentiometer 285 to ground through a lead 286.

A push-pull amplifier stage comprising amplifier tubes 287 and 288 is provided to convert the output signal of the cathode loaded amplifier 281 into a push-pull signal. The amplifier tube 287 has its grid 289 connected to an adjustable point 290 of the potentiometer 285. The amplifier tubes 287 and 288 have their cathodes 291 and 292 connected through a common cathode resistor 293 to the ground lead 286. Screen grids 294 and 295 of the amplifier tubes 287 and 288 are connected through a common resistor 296 to the high voltage lead 279. Plates 297 and 298 of the amplifier tubes 287 and 288 are connected through resistors 299 and 300, respectively, to the high voltage lead 279. The tube 288 has its control grid 301 connected through a lead 302 to a tap on a voltage divider 303 connected across the output of the rectifier filter. The potentiometer 285 serves as a sensitivity control for determining the sensitivity of the circuit to changes in light at the photocell.

In the operation of this push-pull circuit a positive increment of voltage applied to the grid 289 of the amplifier tube 287 causes an increase in current flow through the tube 287. This increased current flow through the resistor 299 causes the potential on the plate 297 to drop and thereby apply a negative output signal to a lead 304 connected to the plate of the tube. The increased current flow through the tube 287 also appears as an increase in current flow through the resistor 296 in the screen grid circuit and through the resistor 293 in the cathode circuit. The screen current flow causes a decrease in screen potential and the cathode current flow a positive increase in cathode potential which, combined with a constant potential applied to the grid 301 of the tube 288 causes the plate current of the tube 288 to decrease and (by decreasing the current flow through the plate resistor 300) produce a positive increment of voltage on a lead 305 connected to the plate 298 of the amplifier tube 288. The signal voltages on the leads 304 and 305 are thus respectively in-phase and out-of-phase with the change in potential produced by changes of light at the photocell 210.

The lead 304 is connected directly to grids 306 and 307 of grid controlled rectifier tubes 308 and 309, while the lead 305 is connected directly to grids 310 and 311 of other grid controlled rectifier tubes 312 and 313. Cathodes 314, 315, 316 and 317 of the rectifier tubes 308 and 309, 312 and 313 are connected together through a common cathode lead 318 that is also connected to the midpoint of the voltage divider 303. Plates 319 and 320 of the rectifier tubes 308 and 309 are connected directly to the ends of a winding 321 of a transformer 322. The winding 321 is center tapped and the center tap is connected through a lead 323 to the common cathode lead 318. A secondary winding 324 of the transformer 322 is connected to one set of shading coils 325 of the motor 269. In like manner plates 326 and 327 of rectifier tubes 312 and 313 are connected through a transformer 328 to shading coils 329 of the motor 269.

The amplifier circuit is adjusted in normal operation so that when the light beam from the light source 207 is focused on the interceptor 209—the edge of the window 242—with half of the light intercepted by the interceptor, the output voltage of the push-pull amplifier—the tubes 287 and 288—will be the same with respect to ground and will be slightly negative with respect to the potential of the lead 318 and the cathodes of the grid controlled rectifier tubes 308, 309, 312 and 313. The alternating flux produced by the field winding 268 of the motor 269 generates voltages in the shading coil windings 325 and 329 that are applied to the transformers 322 and 328 and through the transformers to the grid controlled rectifier tubes. When the grids are at cathode potential or slightly negative thereto the tubes pass plate current so that as far as the shading coils are concerned their circuits are apparently closed.

If a change in light occurs and the potential of the leads 304 and 305 (the output of the pushpull amplifier stage) changes one set of rectifier tubes passes more current and the other set passes less or none. Under this condition the shading coil windings that are transformer-connected to the rectifier tubes that are not drawing current act as if their circuit was open, i. e. no current can flow in the shading coil even though a voltage is generated therein. The other shading coil circuit, i. e. the one connected to the rectifier tubes that are drawing current, acts as if it were connected in closed circuit so that current flows in response to the alternating flux in the motor frame. The unbalance in shading coil circuits produces a torque that causes the motor to rotate. The direction of rotation of the motor is determined according to the set of shading coils that is energized by conduction of current through the associated grid controlled rectifier tubes which set, in turn, is selected according to the quantity of light admitted to the photocell.

This circuit develops a torque in the poise driving motor that is substantially equal to the deviation in position existing between the indicator portion of the weighing mechanism and the follow-up member that is driven by the motor. This circuit is thus applicable to either of the structures described and shown in the preceding figures.

Under some operating conditions it is necessary to exercise greater control over the poise driving motor. In the circuit just described the torque of the motor is proportional to the input signal to the amplifier. It is desirable, if an increase in stability is required, to use a motor control in which the speed of the motor is determined by the signal input to the amplifier and in which the speed is not affected by the resisting torque that the motor must overcome. This type of performance may be attained if a polyphase synchronous motor is energized from a polyphase alternating current supply, the frequency of which supply is determined by the magnitude of the displacement between the indicator and the follower mechanism, i. e. the input to the motor control circuit, and the phase rotation or phase sequence of which supply is determined according to whether the input signal is an increase or a decrease from an average value at which the output frequency of the supply is zero. In this control the polyphase variable frequency supply creates in the motor a magnetic field that stands still when there is no input signal to the control and which rotates either forward or backward at a speed which is determined by the input signal to the control. If a rotor corresponding to the rotor of a synchronous motor having magnetic poles and an amortisseur winding is subjected to the magnetic field produced in the frame or stator of the motor, such a rotor will keep in step with the rotating magnetic field. If it gets out of step because of too rapid an acceleration of the magnetic field, it will attempt to regain synchronism because of the currents that flow in the amortisseur winding.

A polyphase alternating current supply having variable frequency and variable phase sequence may be constructed according to the principles of construction of a beat frequency oscillator. In an ordinary beat frequency oscillator a voltage from a fixed frequency oscillator and a voltage from a variable frequency oscillator are combined in a modulator, the output frequency of which is equal to the difference between the frequencies of the two oscillators. It is immaterial whether the variable frequency oscillator is operating at a higher or lower frequency than the fixed frequency oscillator, because the modulator circuit does not distinguish between the two but delivers a voltage at the difference frequency.

If the output of a fixed frequency oscillator is divided by well known phase shifting circuits a plurality of voltages having the same frequency but differing in phase is obtained. These voltages may be applied to a plurality of modulators in the same manner that the output of the fixed frequency oscillator of an ordinary beat frequency oscillator is applied to one modulator. A variable frequency oscillator is used to supply the other voltage for the modulators. The voltage output of the modulators is polyphase in which the phase relationship between the respective phases—the output of the respective modulators—is controlled by the phase relation between the voltages from the fixed frequency oscillator and in which the frequency of the polyphase output is determined by the difference in frequency between the fixed and the variable frequency oscillators. The phase sequence varies according to which of the oscillators is operating at the higher frequency.

A motor control based on this principle is illustrated in Figure XVII. Alternating current power applied to a primary winding 330 of a power transformer 331 generates voltages in a high voltage secondary winding 332, a rectifier filament winding 333 and an amplifier filament winding 334. A rectifier tube 335 rectifies the high voltage produced by the winding 332 and is connected by a lead 336 to a filter input condenser 337. The lead 336 connecting the rectifier 335 to the filter condenser 337 also passes current to a filter resistor 338 and to a second filter condenser 339 that completes the rectifier filter.

Current flows from the rectifier filter through leads 340 and 341, a filter resistor 342, a photocell resistor 343 and a photocell 344 to ground. Light from a light source 345 that is focused by a lens 346 onto the edge of an interceptor 347 is admitted to the photocell 344 in amounts that vary according to the position of the lens 346. The variations in light cause variations in the current flow through the photocell 344 and thereby change the potential of the junction between the photocell resistor 343 and the photocell 344. These changes in potential are applied to a grid 348 of a cathode loaded amplifier tube 349 that has its plate 350 connected to the junction between the resistors 342 and 343 and that has its cathode 351 connected through a resistor 352 to ground. A condenser 353 connected to the plate 350 of the amplifier tube cooperates with the filter resistor 342 to stabilize the plate voltage and minimize changes in voltage at this point that may result from changes in supply voltage.

Changes in voltage from the photocell 344 are converted into changes in frequency in a multivibrator circuit that functions as a variable frequency oscillator. The multivibrator circuit comprises amplifier tubes 354 and 355. Cathodes 356 and 357 of the amplifier tubes are connected directly to ground. The amplifier tube 354 has its plate 358 connected through a plate resistor 359 to the positive voltage supply lead 341 and also through a condenser 360 to a grid 361 of the amplifier tube 355. The amplifier tube 355 has its plate 362 connected through a plate resistor 363 to the supply voltage line 341 and through a condenser 364 to a grid 365 of the first amplifier tube 354. The grid 361 of the second amplifier tube 355 is connected through a grid resistor 366 to the positive supply voltage lead 341, while the grid 365 of the first amplifier tube 354 is connected through a grid resistor 367 to the cathode 351 of the cathode loaded amplifier tube 349.

The amplifier tubes 354 and 355 constitute an ordinary multivibrator circuit and are alternately conducting. The frequency at which a multivibrator operates is determined by the time required for the grid condensers to charge or discharge after each transfer of conduction from one tube to the other. Thus, when the amplifier tube 355 is conducting and the amplifier tube 354 is non-conducting, the condenser 360 is charged to a high potential by current flowing through the plate resistor 359 and the grid-cathode path of the second tube 355 and the previously charged condenser 364 is discharged by current flow through the grid resistor 367 to permit the potential of the grid 365 to rise. As soon as the potential of the grid 365 rises sufficiently, the amplifier tube 354 begins to conduct and the resulting drop in potential at its plate 358 is transmitted through the condenser 360 to drive the grid 361 of the second amplifier tube 355 negative with respect to its cathode. This raises the potential of the plate 362 and through the condenser 364 raises the potential of the first grid 365. The amplifying action is cumulative and acts to transfer conduction from the tube 355 to the tube 354. During the next succeeding interval of time the condenser 360 charges in the opposite direction by current flow through the grid resistor 366, while the other grid condenser 364 is charged by flow through the grid 365.

The frequency of operation and thus the output frequency is determined by the potential applied to the grid resistors 366 and 367 as well as the time constants of the circuit elements. Since the grid resistor 367 is connected to the cathode 351 of the amplifier tube 349, its potential varies according to the photocell signal and this variation is thus converted into changes in frequency.

The output of the multivibrator is taken from the plate 362 of the amplifier tube 355 through a lead 368 to screen grids 369, 370 and 371 of modulator tubes 372, 373 and 374 respectively.

The fixed frequency oscillator consists of three multivibrators connected as an endless chain in which each multivibrator triggers the next multivibrator of the chain. In this manner three electrical voltages spaced as to time are derived which three voltages correspond to the three voltages in the three phases of a polyphase circuit. The multivibrators have similar circuits so that the description of one is applicable to any of the others. Corresponding elements are distinguished by letters affixed to the reference numerals, i. e. the letter "$a$" pertains to the first of the multivibrators, the letter "$b$" to the second and the letter "$c$" to the third. Amplifier tubes $375a$, $375b$ and $375c$ act as the first tube of each of three identical multivibrator circuits. Amplifier tubes $376a$, $376b$ and $376c$ act as a second tube for each of the multivibrator circuits. Cathodes 377 of all the amplifier tubes 375 and 376 are connected together through a grounded return lead 378.

A grid $379a$ of the first amplifier tube $375a$ is connected through a grid resistor $380a$ to the positive high voltage lead 340. The grid $379a$ is also connected through a condenser $381a$ to a plate $382a$ of the second amplifier tube $376a$. Current is supplied to the plate $382a$ through series plate resistors $383a$ and $384a$ connected to the high voltage lead 340. A plate $385a$ of the first amplifier tube $375a$ is connected through a plate resistor 386 and a lead $387a$ to the junction between plate resistors $383c$ and $384c$ of the third of the three multivibrators. The plate $385a$ is also connected through a condenser $388a$ and a resistor $389a$ to a grid $390a$ of the amplifier tube $376a$. The grid side of the condenser $388a$ is grounded through a resistor $391a$.

In these multivibrator circuits the circuit constants are arranged so that the amplifier tubes 375 are conducting for approximately two-thirds of the total cycle time while the amplifier tubes 376 are conducting for one-third of the cycle time. When the tube $375a$ is conducting current flows into the condenser $381a$ to charge it to a voltage substantially equal to the supply voltage available on the high voltage lead 340. During this same time interval the condenser $388a$ has been discharging through the resistor $391a$. When the condenser $388a$ has been sufficiently discharged it no longer holds the tube $376a$ non-conductive so that current starts to flow through the tube $376a$ and its plate resistors $383a$ and $384a$. This current flow causes a drop in potential of the plate $382a$ and a corresponding drop in potential of the grid $379a$ of the first amplifier tube $375a$ so that its plate voltage immediately rises. The rise in plate voltage of the first tube 375 is transmitted through the condenser $388a$ to the grid of the second tube to make the second tube $376a$ highly conductive. Later, as the charge on the grid condenser $381a$ of the first amplifier tube $375a$ has been drawn off through the grid resistor $380a$, the tube $375a$ again becomes conducting and plate current through the tube $376a$ is cut off.

Similar cycles of operation occur in the other multivibrator circuits. These cyclic operations in the various circuits are correlated and maintained in phase because when the tube $375b$, for example, becomes conducting, it draws its plate current through the resistors $384a$ and $386b$. The voltage drop across the resistor $384a$ produced by this current is transmitted through the condenser 381a to the grid 379a and thus initiates a transfer of conduction from the tube 375a to the tube 376a. Similarly, as the multivibrator circuit tube 375a becomes conducting, it in turn initiates a cycle of operation in the "c" multivibrator by introducing a voltage drop across the resistor 384c. This action is repeated between the multivibrators "c" and "b" to complete the chain of operation.

This combination of multivibrators is one example of structure that provides a polyphase voltage. A single oscillator followed by a plurality of well known phase shifting circuits connected in parallel may be substituted for the combination of the three multivibrators.

The plate 385a of the "a" multivibrator is connected through a lead 392 and a condenser 393 to a grid 394 of the first modulator tube 372. The grid 394 is also connected to ground through a resistor 395. In like manner the "b" multivibrator is connected through a lead 396 and a condenser 397 to a grid 398 of the second modulator tube 373, while the "c" multivibrator is connected through a lead 399 and a condenser 400 to a grid 401 of the third modulator tube 374. The grids 398 and 401 are connected to ground through resistors 402 and 403 respectively.

The input to the modulator tubes thus consists of voltage pulses coming from the photoelectrically controlled multivibrator which pulses are applied to all of the modulator tubes in-phase or simultaneously, and pulses from the multivibrator chain which are applied to the modulator tubes in timed sequence. Each of the modulator tubes is conducting while both of its grids are positive, i. e. during the time that the variable frequency voltage is in phase with the fixed frequency voltage applied to that particular modulator tube. The output of the fixed oscillator energizes the modulator tubes one at a time. Therefore, only one of the modulator tubes is in condition to pass current at any given instant. As the phase between the voltages changes because of a difference in frequency between the oscillators, each of the modulator tubes in turn becomes conducting for time intervals that depend upon the overlapping in time of the voltage pulses.

A synchronous motor may be driven by the current that is drawn through the modulator tubes 372, 373 and 374. Such a motor may have a rotor that carries a winding to produce magnetic poles that are angularly fixed with respect to the rotor, such winding being energized from the high voltage lead 336 through brushes 404 and 405 that cooperate with slip rings 406 and 407. The stator of the synchronous motor is provided with three windings 408, 409 and 410 that are arranged in spaced relationship. The three windings are connected together and to the brush 405. The other ends of the windings 408, 409 and 410 are connected to the plates of modulator tubes 372, 373 and 374 respectively. In this arrangement current flows through rotor winding and through one or another of the stator windings depending upon which of the modulator tubes is conducting at that particular instant of time. The rotor will thereupon position itself with its magnetic poles in alignment with the energized field winding. Since the modulator tubes are responsive to the relatively high frequency from the oscillators and, since they are conducting only during that time when the voltage of each of the oscillators is positive, the current through each of the modulator tubes consists of a series of pulses. Condensers 411, 412 and 413 connected in parallel with the modulator tubes serve to average these pulses into currents suitable for operating the motor.

The speed of the motor, as long as it remains in synchronism, is controlled entirely by the difference in frequency between the fixed oscillator and the variable frequency oscillator and its direction of rotation is determined by which oscillator has the higher frequency. Should the frequency change very rapidly so that the motor falls out of step, the rotating field produced by the sequence of currents flowing in the field windings 408, 409 and 410 generates voltages in the rotor winding which, in turn, produce currents that flow through the winding, the brushes 404 and 405 and a condenser 414 connected between the brushes. The rotor winding under this condition, like the winding of a wound-rotor induction motor, serves as a starting winding to produce torque tending to drive the rotor in such a direction that it follows the rotating magnetic field and attempts to regain synchronism therewith.

This motor control circuit has the advantage that the torque output of the motor is independent of the speed at which it is operating and that the speed is uniquely determined by the input signal applied to the control. These characteristics make this motor control circuit particularly advantageous for use in driving the poise of an automatic scale or a follow-up mechanism to maintain registry between an independently movable member and a driven member that is controlled and driven by the motor.

Various modifications in the specific elements of this automatic weighing scale may be made without departing from the spirit and scope of the invention.

Having described my invention, I claim:

1. In an automatic weighing mechanism, in combination, a pivoted lever, means for applying load forces to the lever, a poise on the lever, an indicator for indicating the position of the lever, a follow-up mechanism having an element that follows the indicator, means operatively connecting the poise to the follow-up to drive the poise along the lever whereby the poise position along the lever is determined by the position of the follow-up as it follows the indicator so that the load offset by the poise corresponds to the position of the follow-up and indicator.

2. In an automatic weighing mechanism, in combination, a pivoted lever, means for applying load forces to the lever, a poise movable along the lever for counterbalancing the load forces, a follow-up mechanism for following the movement of the lever, and a driving connection between the follow-up mechanism and the poise that positions the poise along the lever according to the position of the lever as measured by movement of the follow-up mechanism as it follows the movement of the lever.

3. In an automatic weighing mechanism, in combination, a pivoted lever, means for applying load forces to the lever, a poise that is movable along the lever for counterbalancing the load forces, a motor for driving the poise along the lever, a pickup mechanism that generates a signal for controlling the motor according to the relative position of the lever and a portion of the pickup mechanism, and means operatively connected to the motor for moving at least said portion of said pickup mechanism according to the movement of the poise.

4. In an automatic weighing mechanism, in combination, a pivoted lever, means for applying load forces to the lever, a poise that is movable along the lever for counterbalancing the load forces, a motor for driving the poise along the lever, control means that are responsive to the relative position of the lever and a portion of said control means for controlling the motor, and mechanism driven by the motor for moving said portion of the controlling means as the poise is moved along the lever.

5. In an automatic weighing mechanism, in combination, a pivoted lever, means for applying load forces to the lever, a poise that is movable along the lever for counterbalancing the load forces, a stop mechanism that includes a member on the lever and a member on a stationary frame for limiting the travel of the lever, a motor for driving the poise, said motor being connected to move at least one member of said stop mechanism to permit further movement of the lever, and means carried in said stop mechanism for controlling the power input into the motor.

6. In an automatic weighing mechanism, in combination, a pivoted lever, means for applying load forces to the lever, a poise that is movable along the lever for counterbalancing the load forces, a member carried on the lever and moved with respect to the lever according to the movement of the poise, a stop mechanism that is engaged by the member for limiting the movement of the lever under the influence of a load, a motor for driving the poise, and a motor control that drives the motor in a direction that tends to decrease the force acting between the member and the stop mechanism.

7. In an automatic weighing mechanism, in combination, a pivoted lever, means for applying load forces to the lever, a poise that is movable along the lever for counterbalancing the load forces, an indicator carried on the lever, a member that is movable along the path of the indicator, a motor for driving the poise along the lever and the member along the path of the indicator, and means responsive to deviations in relative position of the indicator and the member for controlling the motor.

8. In an automatic weighing mechanism, in combination, a pivoted lever, means for applying load forces to the lever, a poise that is movable along the lever for counterbalancing the load forces, means for detecting deviations in the position of the lever from its load counterbalancing position, means for generating an alternating voltage having a frequency that varies from a mean frequency according to the deviations in position of the lever, means for generating a polyphase voltage having a constant frequency equal to the said mean frequency, means for combining the variable frequency and constant frequency voltages to produce a variable frequency polyphase voltage, and a synchronous motor driven by the variable frequency polyphase voltage for driving the poise.

9. In an automatic weighing mechanism, in combination, a pivoted lever, means for applying load forces to the lever, a poise that is movable along the lever for counterbalancing the load forces, a pickup for converting movement of the lever into an electrical signal, means for generating a voltage having a frequency that varies from a mean frequency in accordance with signals from the pickup, means for generating a voltage at said mean frequency, the output of one of the voltage generating means being polyphase, means for combining the voltages into a polyphase voltage of variable phase sequence and frequency, and a synchronous motor energized by the last mentioned voltages for driving the poise.

10. In an automatic weighing mechanism, in combination, a pivoted lever, means for applying load forces to the lever, a poise that is movable along the lever for counterbalancing the load forces, a pickup for converting lever movement into an electrical signal, a polyphase beat-frequency oscillator, the output frequency of which is controlled by the pickup, and a synchronous motor driven by the output of the oscillator for driving the poise along the lever.

11. In an automatic weighing mechanism, in combination, a lever, means for applying load forces to the lever, a poise on the lever for counterbalancing the load forces, a motor operatively connected to the poise for driving the poise along the lever, signal generating means having a first part operatively connected to the lever and a second part operatively connected to the motor for generating a motor controlling signal corresponding to the deflection of the lever from a reference position that moves along the path of the lever according to the position of the poise along the lever and means for controlling the motor according to the signal.

12. In an automatic weighing mechanism, in combination, a lever, means for applying load forces to the lever, a poise on the lever for counterbalancing the load forces, a motor operatively connected to the poise for driving the poise along the lever, displacement detecting means that is operatively connected to the lever and to the motor for differentially combining the displacement of the lever from a reference position and the displacement of the poise from a reference position, and motor control means operatively connected to the detecting means for controlling the motor according to the difference of the beam and poise displacements.

13. In an automatic weighing mechanism, in combination, a lever, means for applying load forces to the lever, a poise on the lever for counterbalancing the load forces, a motor operatively connected to the poise for driving the poise along the lever, a member carried on and vertically movable with respect to the lever and operatively connected to the poise, and control means cooperating with said member for generating a motor controlling signal which causes said motor to drive the poise to a position to counterbalance the load as the lever moves to a position corresponding to the magnitude of the load.

14. In an automatic weighing mechanism, in combination, a lever, means for applying load forces to the lever, a poise on the lever for counterbalancing the load forces, a motor operatively connected to the poise for driving the poise along the lever, a member carried on the lever, means for driving said member vertically with respect to the lever according to the movement of the poise along the lever, and control means for the motor, said control means being sensitive to the displacement of said member from a fixed reference position and controlling the motor to reduce the displacement, which displacement is the difference between the displacement of the lever and the movement of the member relative to the lever.

15. In an automatic weighing mechanism, in combination, a pivoted lever, means for applying load forces to the lever, a poise movable along the lever for counterbalancing the load forces, a motor connected to the poise for driving the poise along the lever, a first member supported on the lever, a second member supported adjacent the lever, one of said members being movable relative to its support, means operatively connecting the movable one of said members to the motor for moving the member generally vertically relative to its support, and means responsive to the displacement of one of said members relative to the other for driving the motor whereby the displacement of the poise along the lever is proportional to the movement of the lever.

MAYNARD C. YEASTING.

REFERENCES CITED

The following references are of record in the file of this patent:

UNITED STATES PATENTS

| Number | Name | Date |
|---|---|---|
| 1,872,851 | Van Weenan | Aug. 23, 1932 |
| 1,952,171 | Jones | Mar. 27, 1934 |
| 2,067,743 | Weckerly | Jan. 12, 1937 |
| 2,108,410 | Perry | Feb. 15, 1938 |